Oct. 15, 1929.  H. V. PUTMAN  1,731,350
SPLIT ROTOR CONSTRUCTION
Filed Sept. 2, 1927
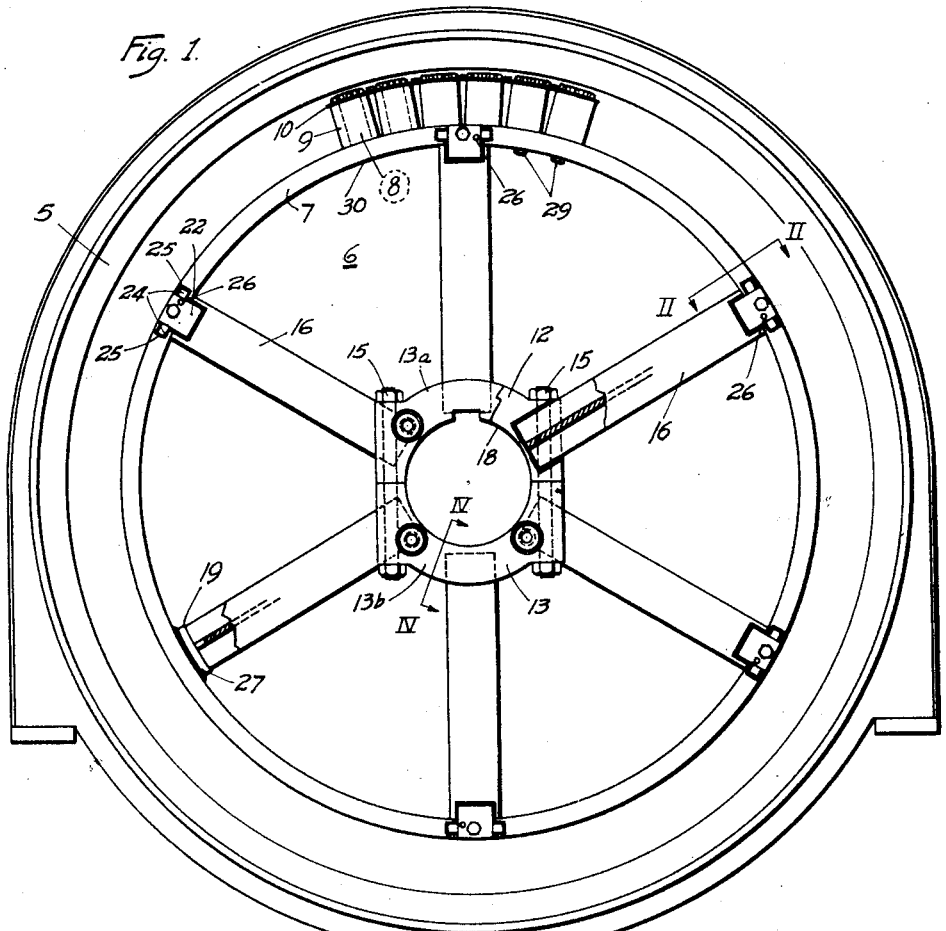
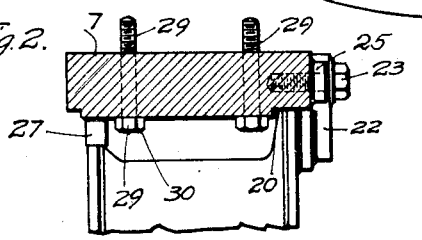
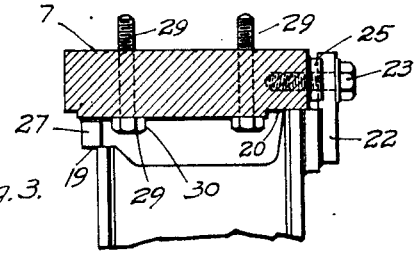
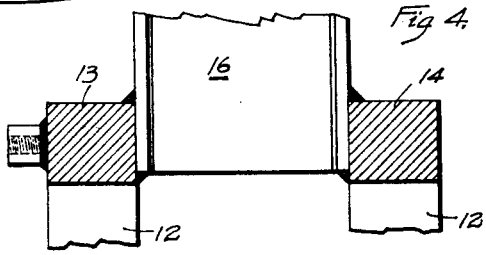
INVENTOR
Henry V. Putman.
BY
ATTORNEY Patented Oct. 15, 1929

1,731,350

UNITED STATES PATENT OFFICE

HENRY V. PUTMAN, OF EDGEWOOD, PENNSYLVANIA, ASSIGNOR TO WESTINGHOUSE ELECTRIC & MANUFACTURING COMPANY, A CORPORATION OF PENNSYLVANIA

SPLIT ROTOR CONSTRUCTION

Application filed September 2, 1927. Serial No. 217,044.

My invention relates to wheels, and it has particular relation to flywheels and motor rotor members which have to be mounted on a shaft having other apparatus mounted on both ends thereof.

The principal object of my invention is to provide a novel rotor construction having a rim member which is made solid, in one piece, the inside diameter of which is sufficiently large to pass over the apparatus or obstructions at the ends of the shaft, and having a detachable hub and spider member which is split, whereby all the advantages of a split rotor construction are obtained, without the disadvantage of having to provide a rather expensive connection for the relatively heavy rim portion, with inevitable loss of strength as a result of the split. In fact, it has been practically impossible to build a large, split flywheel heretofore, on account of its low mechanical strength.

A further and important object of my invention is to provide an electric motor having mechaniscal features which are especially suitable for air and ammonia and $CO_2$ compressor service and similar low-speed applications.

Another object of my invention is to provide a rotor member for a dynamo-electric machine, so made that the electrical and magnetic parts of the rotor may be shipped completely assembled, and yet including a structure which is as easily assembled, in the field, as the conventional split rotor having a split electrical and magnetic rim portion.

A further object of my invention is to provide a novel construction consisting of fabricated steel members, which results in mechanical parts of greater strength, simpler and more economical construction, and smaller flywheel effect, which is desired in some motors. Since my rotor is lighter in weight than a cast rotor, but without any sacrifice in mechanical strength, lighter shafts may be utilized and bearing wear is decreased.

With the foregoing and other objects in view, my invention consists in the details, combinations and methods of construction hereinafter described and shown in the accompanying drawings, wherein Figure 1 is an elevational view of a motor embodying my invention, with some of the parts broken away to show the construction, Fig. 2 is a cross-sectional view on the line II—II of Fig. 1, illustrating the joint between the rim member and one of the spokes of the detachable hub member, Fig. 3 is a similar view illustrating the position of the parts when partially assembled, and Fig. 4 is a cross-sectional view on the line IV—IV of Fig. 1, showing the construction of the welded hub member.

In the drawing, my invention is shown, by way of example, as applied to a low-speed synchronous motor for compressor service, and comprising a stator member 5 which forms no part of my present invention, and a rotor member 6 which embodies a new design in accordance with my invention. The rotor member comprises a solid rim member 7 which may be made of hot rolled steel, rolled to circular form on a mandrel, with the ends welded together to form a continuous ring, or it may be cast steel. The rim member carries the magnetic core members and the electrical windings, which, in this case, comprise salient pole pieces 8 carrying direct-current field windings 9 and damper windings 10.

According to my invention, the rotor member 6 is provided with a split hub member 12, which is cut from a cold rolled steel slab of from 2 to 4 inches thickness. Two slabs 13 and 14 are utilized, one on each end of the hub member, thereby assuring equal bearing surface on the shaft on each end of the hub. Each of the slabs 13 and 14 is cut in half to provide two portions, as indicated at 13ª and 13ᵇ, the two portions being bolted together by means of four bolts 15. A plurality of rotor spokes 16 are provided, consisting of H-section steel beams which project radially from the hub member and which are welded between the hub plates or slabs 13 and 14.

The split hub and spoke member is machined after being bolted together with very fine shims temporarily placed between the two halves; a hole 18 being bored for the shaft and the ends of the spokes being machined to provide a light press fit in the rim, as indicated at 19 and 20, the press fit being about ¾ of an inch in length.

Each of the spokes 16 is provided with radially projecting tab 22 which is welded to the spoke and extends in overlapping relation to the rim member 7. Bolts 23 are provided, which extend through the said tabs 22 and into the rim member for drawing the parts into position with a press fit, as indicated in Figs. 3 and 2. The rim member is provided with notches 24 into which the said tabs fit, so that the bolts are relieved from the strain of transmitting the torque or angular forces to the rim, the notches 24 being conveniently provided by welding keys 25 in position against the sides of the tabs 22 after the rotor has been bolted together, the keys 25 being welded, of course, to the rim member 7.

It will readily be seen that for field assembly, the hereinabove described construction has a distinct advantage over motors with either a split hub, or a split rotor. The rotor is shipped completely assembled. To install the rotor on the compressor shaft, it is taken down into its three component parts, by removing the six bolts which hold the rim to the spokes and the four hub bolts which hold the two halves together. Each of the parts is comparatively light, and can be handled easily by ordinary tackle of the chain block type. To reassemble the rotor, the two halves of the spider are assembled in place on the shaft and bolted together. The ring is then rolled into position, lifted over the crank disc, (assuming the compressor to be of a duplex type), lifted into place on the spokes, and drawn up by the six holding bolts. The rim has a sufficiently large inside diameter to slip over the crank disc on practically all standard duplex compressors.

Setscrews 26 are provided in the tabs 22 whereby the rim may be forced off of the split hub and spider member when the rotor is to be taken apart.

A detail of advantage in the practical embodiment of my invention in motor rotors, is the provision of press-fit portions 19 and 20 of different diameters, which may be conveniently accomplished by welding short arcuate pieces 27 to the inner periphery of the rim 7, as shown in Figs. 1 to 3, the inner edges of these pieces being bored to the proper diameter for the press fit 19. In this way, it is practical to assemble the spider member, by starting it into the rim member from the side of the larger press fit 20, as indicated in Fig. 3, and, at the same time, to limit the length of the press-fit portions to a small value such as three-quarters of an inch, thereby facilitating the assembly by means of drawing up on the bolts 23. At the same time, it is possible to utilize other bolts 29 for securing the pole pieces 8 without having to countersink the bolt heads 30 in order to permit the assembly of the spider member with a press fit on both sides of the bolts 29.

Heretofore, a completely split rotor has been required for duplex compressor service, if the assembly was to be made in the field. When the assembly was not made in the field, it has been necessary for the customer to ship the compressor shaft to the factory of the electrical manufacturer for him to press his dynamo-electric machine rotor on the shaft, one of the cranks of the compressor having first been removed to permit the assembly of a non-split motor rotor.

With my invention, it is only necessary for the customer to measure his shaft diameter, and the electrical manufacturer will then bore the split rotor member to the exact dimension required, before shipment.

While I have described my invention in a preferred form as applied to dynamo-electric machine rotors, it is obvious that the invention is also applicable to wheels, in general, such as flywheels for water-wheel generators which have forged couplings over which the flywheel must be assembled. It is also obvious that many changes may be made in the details of construction, without departing from the spirit of my invention. I desire, therefore, that the appended claims shall be given the broadest interpretation consistent with their language and the prior art.

I claim as my invention:

1. A rotor member for a dynamo-electric machine comprising a solid rim member having magnetic core members and electrical windings attached thereto; a split hub member, radially extending supporting members carried by the respective halves of said split hub member, the outer peripheries of said radially extending members having a press fit in said rim member, and means for holding said rim member in position on said radially extending members.

2. A rotor member for a dynamo-electric machine comprising a solid rim member having magnetic core members and electrical windings attached thereto, a split hub member, radially extending supporting members carried by the respective halves of said split hub member, the outer peripheries of said radially extending members having a press fit in said rim member, and securing means comprising bolts for drawing the parts into position with a press fit.

3. A rotor member for a dynamo-electric machine comprising a solid rim member having magnetic core members and electrical windings attached thereto; a split hub member, radially extending supporting members carried by the respective halves of said split hub member, the outer peripheries of said radially extending members having a press fit in said rim member, and securing means comprising a plurality of radially projecting tabs integrally secured to said radially extending supporting members in overlapping relation to said rim member, and bolts extending through said tabs and into said rim member for drawing the parts into position with a press fit.

4. A rotor member for a dynamo-electric machine comprising a solid rim member having magnetic core members and electrical windings attached thereto, a split hub member, radially extending supporting members carried by the respective halves of said split hub member, the outer peripheries of said radially extending members having a press fit in said rim member, and securing means comprising a plurality of radially projecting tabs integrally secured to said radially extending supporting members in overlapping relation to said rim member, and bolts extending through said tabs and into said rim member for drawing the parts into position with a press fit, said rim being provided with notches into which said tabs fit to relieve said bolts from the strain of transmitting angular forces or torque to said rim.

5. A rotor member for a dynamo-electric machine comprising a rim member having magnetic core members and electrical windings attached thereto, a hub member, radially extending supporting members carried by said hub member, the outer periphery of said radially extending members having a press fit in said rim member, and securing means comprising a plurality of radially projecting tabs integrally secured to said radially extending supporting members in overlapping relation to said rim member, and bolts extending through said tabs and into said rim member for drawing the parts into position with a press fit, said rim being provided with notches into which said tabs fit to relieve said bolts from the strain of transmitting angular forces to the rim.

6. A wheel comprising a solid rim member and a split hub member, radially extending supporting members carried by the respective halves of said split hub member, the outer peripheries of said radially extending members having a press fit in said rim member, and means for holding said rim member in position on said radially extending members.

7. A wheel comprising a solid rim member and a split hub member, radially extending supporting members carried by the respective halves of said split hub member, the outer peripheries of said radially extending members having a press fit in said rim member, and securing means comprising bolts for drawing the parts into position with a press fit.

8. A wheel comprising a solid rim member and a split hub member, radially extending supporting members carried by the respective halves of said split hub member, the outer peripheries of said radially extending members having a press fit in said rim member, and securing means comprising a plurality of radially projecting tabs integrally secured to said radially extending supporting members in overlapping relation to said rim member, and bolts extending through said tabs and into said rim member for drawing the parts into position with a press fit.

9. A wheel comprising a solid rim member and a split hub member, radially extending supporting members carried by the respective halves of said split hub member, the outer peripheries of said radially extending members having a press fit at two spaced circles within said rim member, the radii of said circles being different, and means for holding said rim member in position on said radially extending members.

In testimony whereof, I have hereunto subscribed my name this first day of September, 1927.

HENRY V. PUTMAN.